March 31, 1936.  A. LUCKANICH  2,036,155
ELECTRIC WINDSHIELD DEFROSTER AND WIPER
Filed April 16, 1935  2 Sheets-Sheet 1
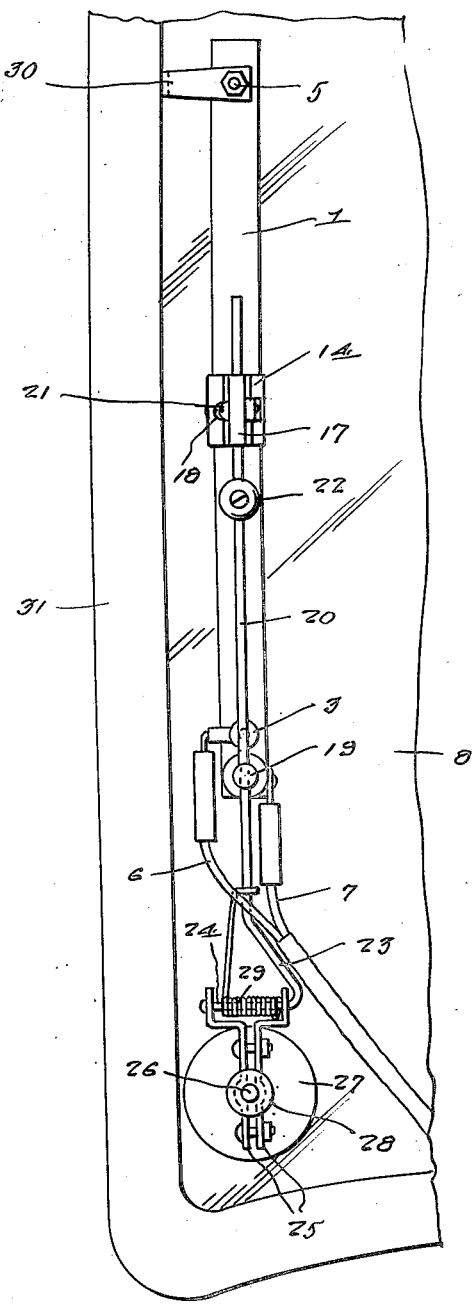
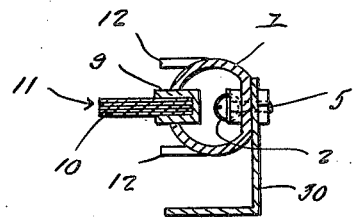
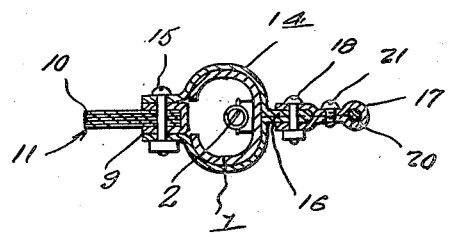
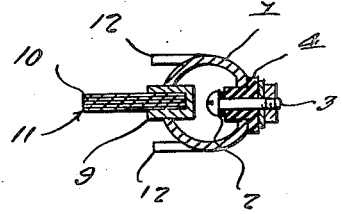
Inventor
*A. Luckanich*
By *Clarence A. O'Brien*
Attorney

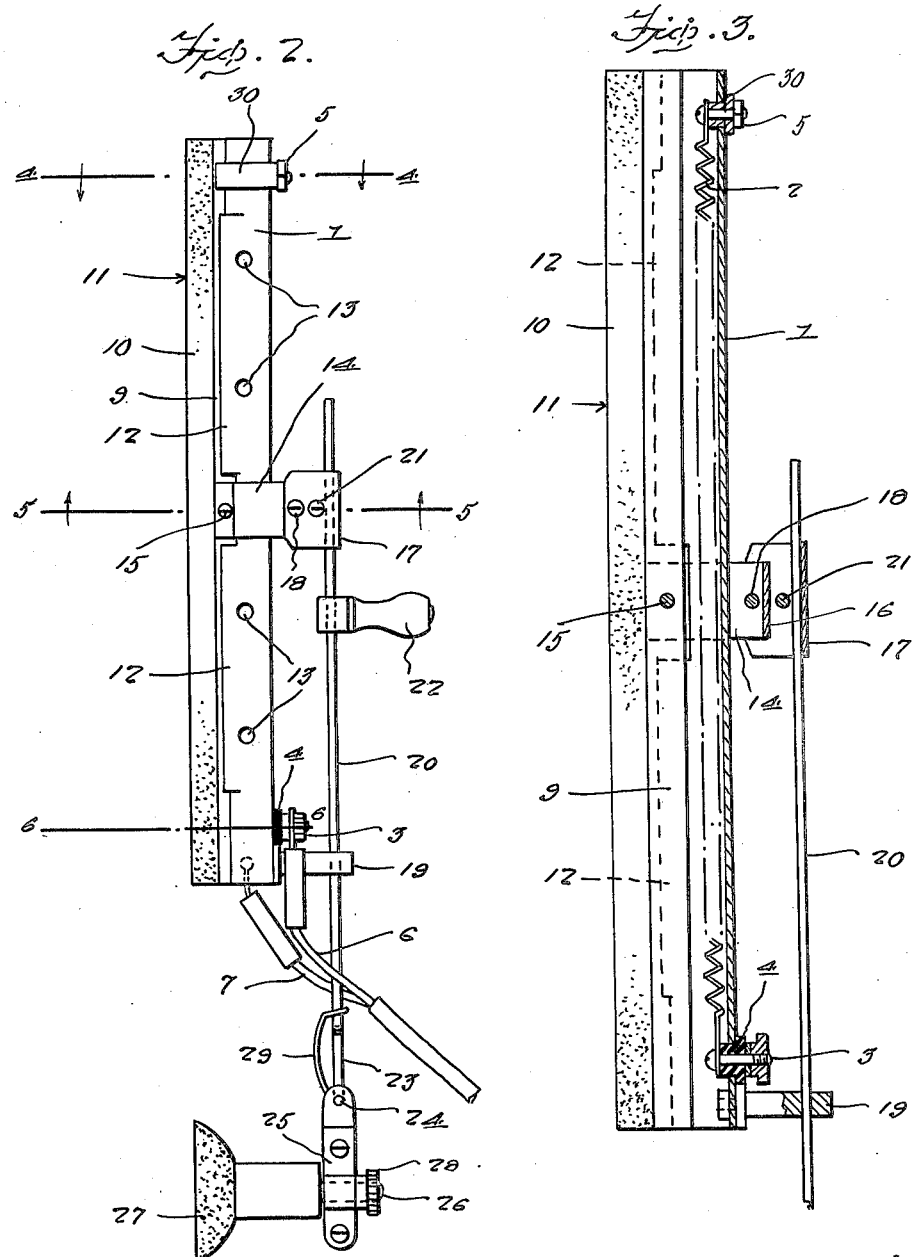

Patented Mar. 31, 1936

2,036,155

UNITED STATES PATENT OFFICE 2,036,155

ELECTRIC WINDSHIELD DEFROSTER AND WIPER

Alexander Luckanich, Binghamton, N. Y.

Application April 16, 1935, Serial No. 16,691

2 Claims. (Cl. 15—250)

The present invention relates to new and useful improvements in electric windshield defrosters and wipers and has for its primary object to provide, in a manner as hereinafter set forth, a device of this character which, in addition to functioning as a wiper in the usual manner, comprises novel means for preventing the formation of sleet, snow, and condensation or frost on the windshield.

Another important object of the invention is to provide a windshield appliance of the aforementioned character which is adapted to be expeditiously mounted on either the inside or the outside of a windshield.

Still another important object of the invention is to provide a windshield appliance of the character described of the type including an electric element housing or casing and a wiper blade, together with novel means for mounting said blade in the housing or casing.

Other objects of the invention are to provide an electric windshield defroster and wiper which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a front elevational view, showing a device in accordance with the present invention mounted on the inner side of a windshield.

Figure 2 is a view in side elevation of the invention.

Figure 3 is a view in vertical section through the invention, the supporting means therefor being omitted.

Figure 4 is a view in horizontal section, taken substantially on the line 4—4 of Figure 2.

Figure 5 is a horizontal sectional view, taken substantially on the line 5—5 of Figure 2, looking upwardly with some parts above the plane line 5—5 omitted.

Figure 6 is a view in horizontal section, taken substantially on the line 6—6 of Figure 2.

Referring now to the drawings in detail, it will be seen that the embodiment of the invention which has been illustrated comprises an elongated, substantially tubular housing 1 of any suitable metal having mounted therein an electric heating element 2. As will be understood by comparison of Figure 2 with Figures 4, 5 and 6, the end portions of the housing 1 are substantially circular in cross section, Figures 4 and 6, while the intermediate portion of the housing 1 is of the cross-sectional shape shown in Figure 5. One end of the heating element 2 is connected to a binding post 3 and insulated from the housing 1, as at 4, the other end of said heating element being electrically connected to said housing 1, as at 5. Conductor wires 6 and 7 are connected to the binding post 3 and the housing 1, respectively.

The housing 1 is longitudinally slit from end to end on the side thereof which is adjacent the windshield 8 for the reception of the substantially U-shaped metallic back 9 of the wiper blade 10 which, in the exemplification shown, is in the form of a plurality of thin strips of rubber. The wiper unit is designated generally by the reference numeral 11. As illustrated to advantage in Figures 4 and 6 of the drawings, the end portions of the longitudinally split substantially tubular housing 1 are engaged on opposite sides of the back 9. At spaced points, Figure 2, pairs of flanges 12 are struck from the housing 1 and project therefrom in spaced relation to the opposite sides of the back 9, as also shown to advantage in Figures 4 and 6 of the drawings. The flanges 12 have openings 13 formed therein. It will thus be seen that passages have been provided for the escape of the heat from the element 2. Of course, the heat may also escape from the housing 1 at the open ends thereof.

A clamp 14 of suitable metal is mounted on the housing 1 between the pairs of flanges 12, said clamp having the wiper unit 11 firmly secured between the end portions thereof by a bolt 15 (see Figure 5). The bight portion of the clamp 14 is squeezed together in a manner to provide a projection or ear 16 upon which a clamp 17 is secure, as by a bolt 18. Mounted on one end portion of the housing 1 is a post 19 through which a supporting arm 20 passes. One end portion of the arm 20 is secured in the clamp 17 by a screw 21. A handle 22 is mounted on the arm 20.

The parts at the plane line 5—5 on Figure 1 are preferably shaped in cross-section as clearly shown in Figure 5.

At its other end, the arm 20 includes a substantially diagonally extending portion 23 which terminates in an end portion 24 which extends at right angles to said arm 20, as best seen in Figure 1 of the drawings. Journaled on the end portion 24 of the arm 20 is a pair of jaws 25, said jaws being adapted to receive therebetween a stem 26 which projects from a suction cup 27. A nut 28 retains the jaws 25 on the shank 26. A spring 29 is mounted on the end portion 24 of the arm 20 and said spring is operatively connected to said arm in a manner to yieldingly urge the wiper blades 10 against the windshield.

The rubber suction cup 27 constitutes means for mounting the appliance on the inner side of the windshield 8 to prevent condensation from forming thereon or to remove condensation which has already formed. When the element 2 is energized from the usual storage battery of the automobile through the conductors 6 and 7 heated air is discharged from the housing 1 onto the windshield 8 to remove condensation or prevent its formation, as will be readily understood. The device may be conveniently operated through the medium of the handle 22. The reference numeral 30 designates an angular stop on the free end portion of the housing 1 which is adapted to support the device against one side of the frame 31 of the windshield 8, as seen in Figure 1 of the drawings. When it is desired to use the device on the outer side of the windshield, as when said device is to be used as a wiper or to prevent the formation of sleet or snow, said device is simply removed from the suction cup 27 and attached to the usual shaft of a conventional windshield wiper.

It is believed that the many advantages of an electric windshield defroster and wiper constructed in accordance with the present invention will be readily understood, and although a preferred embodiment of the device is as illustrated and described, it is to be understood that changes in the details of construction and in the combination and arrangement of parts may be resorted to which will fall within the scope of the invention as claimed.

What is claimed is:—

1. A windshield attachment of the class described comprising a substantially tubular, longitudinally split housing, an electric heating element mounted in said housing, a wiper blade mounted in the longitudinal split of the housing and projecting therefrom for engagement with a windshield, the end portions of the opposed walls of the housing being engaged with opposite sides of the blade, said housing including pairs of integral flanges extending on opposite sides of the blade in spaced relation thereto and defining heat chambers on each side of the blade thereof, said flanges having openings therein, a clamp encircling the housing intermediate the pairs of flanges and secured to opposite sides of the blade, and means for mounting the housing for swinging movement on the windshield.

2. A windshield attachment of the class described comprising a substantially tubular, longitudinally split housing, an electric heating element mounted in said housing, a wiper blade mounted in the longitudinal split of the housing and projecting therefrom for engagement with a windshield, the end portions of the opposed walls of the housing being engaged with opposite sides of the blade, said housing including pairs of integral flanges extending on opposite sides of the blade in spaced relation thereto, and defining heat chambers on each side of the blade thereof, a clamp encircling the housing intermediate the pairs of flanges and secured to opposite sides of the blade, and means for mounting the housing for swinging movement on the windshield.

ALEXANDER LUCKANICH.